US011115161B2

United States Patent
Radulescu et al.

(10) Patent No.: US 11,115,161 B2
(45) Date of Patent: Sep. 7, 2021

(54) TRANSMISSION DIVERSITY FOR FBE IDLE PERIOD HANDLING

(71) Applicant: QUALCOMM Incorporated, San Diego, CA (US)

(72) Inventors: Andrei Dragos Radulescu, San Diego, CA (US); Srinivas Yerramalli, San Diego, CA (US); Xiaoxia Zhang, San Diego, CA (US); Aleksandar Damnjanovic, Del Mar, CA (US); Tamer Kadous, San Diego, CA (US); Jing Sun, San Diego, CA (US); Yongbin Wei, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/400,822

(22) Filed: May 1, 2019

(65) Prior Publication Data

US 2019/0342045 A1 Nov. 7, 2019

Related U.S. Application Data

(60) Provisional application No. 62/665,841, filed on May 2, 2018.

(51) Int. Cl.
*H04L 5/00* (2006.01)
*H04W 72/12* (2009.01)
*H04W 72/04* (2009.01)
*H04W 88/10* (2009.01)
*H04W 74/08* (2009.01)
*H04L 27/00* (2006.01)
*H04W 84/12* (2009.01)

(52) U.S. Cl.
CPC .......... *H04L 5/0035* (2013.01); *H04L 5/0055* (2013.01); *H04L 27/0006* (2013.01);
(Continued)

(58) Field of Classification Search
CPC ..... H04L 5/0035; H04L 5/001; H04L 5/0055; H04L 27/0006; H04W 72/0446;
(Continued)

(56) References Cited

U.S. PATENT DOCUMENTS 10,652,866 B2* 5/2020 Salem ................... H04L 5/0048
2016/0309512 A1* 10/2016 Li ....................... H04W 74/0816
(Continued)

FOREIGN PATENT DOCUMENTS

WO 2017047973 A1 3/2017

OTHER PUBLICATIONS

Maldonado et al, "A Fully Coordinated New Radio-Unlicensed System for Ultra-Reliable Low-Latency Applications", IEEE (Year: 2020).*

(Continued)

*Primary Examiner* — Omer S Mian
(74) *Attorney, Agent, or Firm* — Patterson & Sheridan, L.L.P

(57) ABSTRACT

Scheduling around frame based equipment (FBE) idle periods reduces the flexibility of scheduling and partitioning. This leads to a latency caused by waiting for the next downlink scheduling opportunity and skipping over unused uplink scheduling slots. According to certain aspects, to reduce overhead caused by idle time and ensure full downlink scheduling, a base station (BS) alternates between idle periods and channel occupancy time every fixed frame period with one or more other synchronized BSs, between components carriers of the BS, or both. Thus, a BS can always schedule downlink on a carrier during an idle period scheduled for a different BS and/or a different carrier.

17 Claims, 18 Drawing Sheets

(52) U.S. Cl.
CPC ... *H04W 72/0446* (2013.01); *H04W 72/1215* (2013.01); *H04W 72/1268* (2013.01); *H04W 72/1273* (2013.01); *H04W 74/0808* (2013.01); *H04W 88/10* (2013.01); *H04W 84/12* (2013.01)

(58) Field of Classification Search
CPC ......... H04W 72/1263; H04W 72/1205; H04W 72/1268; H04J 3/1605
See application file for complete search history.

(56) References Cited

U.S. PATENT DOCUMENTS

| | | | |
|---|---|---|---|
| 2017/0318607 A1 | 11/2017 | Tiirola et al. | |
| 2018/0054792 A1* | 2/2018 | Lee | H04W 64/00 |
| 2018/0249469 A1* | 8/2018 | Park | H04W 16/14 |
| 2018/0255578 A1 | 9/2018 | Kim et al. | |
| 2019/0013898 A1* | 1/2019 | Lei | H04W 72/0446 |
| 2019/0268108 A1* | 8/2019 | Kim | H04W 56/0005 |

OTHER PUBLICATIONS

International Search Report and Written Opinion—PCT/US2019/030382—ISA/EPO—dated Jul. 2, 2019.

Qualcomm Incorporated: "TxOP Frame Structure for NR Unlicensed," 3GPP Draft; R1-1804829 7.6.2 Frame Structure for NR-U Operation, 3RD Generation Partnership Project (3GPP), Mobile Competence Centre; 650, Route Des Lucioles; F-06921 Sophia-Antipolis Cedex; France, vol. Ran NG1, No. Sanya, China; Apr. 16, 2018-Apr. 20, 2018, Apr. 15, 2018, XP051427095, 8 pages http://www.3gpp.org/ftp/Meetings%5F3GPP%5FSYNC/RAN1/Docs; p. 2, lines 4-14 section 4; pp. 6-7 figure 9.

* cited by examiner

TRANSMISSION DIVERSITY FOR FBE IDLE PERIOD HANDLING

CROSS-REFERENCE TO RELATED APPLICATION(S)

This application claims benefit of and priority to U.S. Provisional Patent Application Ser. No. 62/665,841, filed May 2, 2018, herein incorporated by reference in its entirety as if fully set forth below and for all applicable purposes.

BACKGROUND

Field of the Disclosure

Aspects of the present disclosure relate to wireless communication and, more particularly, to reducing idle time.

Description of Related Art

Wireless communications systems are widely deployed to provide various communication services such as telephony, voice, video, data, messaging, broadcast, etc. These wireless communication systems may employ multiple-access technologies capable of supporting communication with multiple users by sharing available system resources (e.g., bandwidth, time, frequency, power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communications system may include a number of base stations (BSs), which are each capable of simultaneously supporting communication for multiple communication devices, otherwise known as user equipment (UE).

These multiple access technologies have been adopted in various telecommunication standards to provide a common protocol that enables different wireless devices to communicate on a municipal, national, regional, and even global level. New Radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

A method and apparatus for ensuring full downlink (DL) scheduling is described. The method and apparatus comprise at least one synchronized gNodeB (gNB) alternating idle and channel occupancy time (CoT) with at least one other synchronized gNB. Also, in one example, the synchronized gNB can comprise a distributed unit (DU).

In another example, the percentage of channel occupancy time shared by the at least one synchronized gNB is flexible.

In still another example, the at least one of the synchronized gNB performs a listen before talk (LBT) procedure at the end of an idle period (IP).

In another example, the at least one of the synchronized gNBs performs a LBT procedure after alternating between at least one other of the synchronized gNBs.

In still another example, the at least one synchronized gNBs performs a LBT procedure between a transmission and an acknowledgement.

In another example, the at least one synchronized gNB belongs to a coordinated multipoint (CoMP) of gNBs which are staggered.

In still another example, the apparatus and method for ensuring full DL scheduling further comprises alternating the IP and the CoT of the at least one synchronized gNB between different component carriers (CCs).

In still another example, the at least one synchronized gNB alternates between CoT and an IP least once every fixed frame period.

A method and apparatus for ensuring full DL scheduling is described. The method and apparatus comprise at least one synchronized gNB alternating IP and CoT between different CCs.

In still another example, a plurality of CCs belong to the same at least one synchronized gNB.

In still another example, all the CCs belong to the same at least one synchronized gNB.

In still another example, the different CCs are staggered in frequency.

In some examples, a method for wireless communication that may be performed by a first base station (BS) to ensure full DL scheduling is provided. The method generally includes scheduling DL transmission for at least one device. The scheduling includes alternating IPs and CoTs between the first BS and at least one other BS, synchronized with the first BS, and/or between different CCs used by the first BS. The method generally includes transmitting to the at least one one device based on the downlink scheduling.

In some examples, a percentage of the CoTs scheduled by the first BS and the at least one other BS is flexible.

In some examples, the method further includes performing a LBT procedure at the end of the scheduled IPs.

In some examples, the method further includes performing a LBT procedure after alternating between each of the BSs or CCs.

In some examples, the method further includes performing a LBT procedure between a transmission and an acknowledgement.

In some examples, wherein the first BS and the at least one other BS belong to a CoMP of BSs.

In some examples, the method further includes alternating the IPs and the CoTs between different CCs of the first BS and the at least one other BS.

In some examples, the scheduling includes scheduling IPs for the first BS during at least a portion of a CoT for the at least one other BS and scheduling CoTs for the first BS during an IP for the at least one other BS.

In some examples, the scheduling includes alternating between a CoT and an IP for the first BS at least once every fixed frame period.

In some examples, the first BS and/or the second BS is a DU or a gNB.

In some examples, the different CCs are staggered in frequency.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
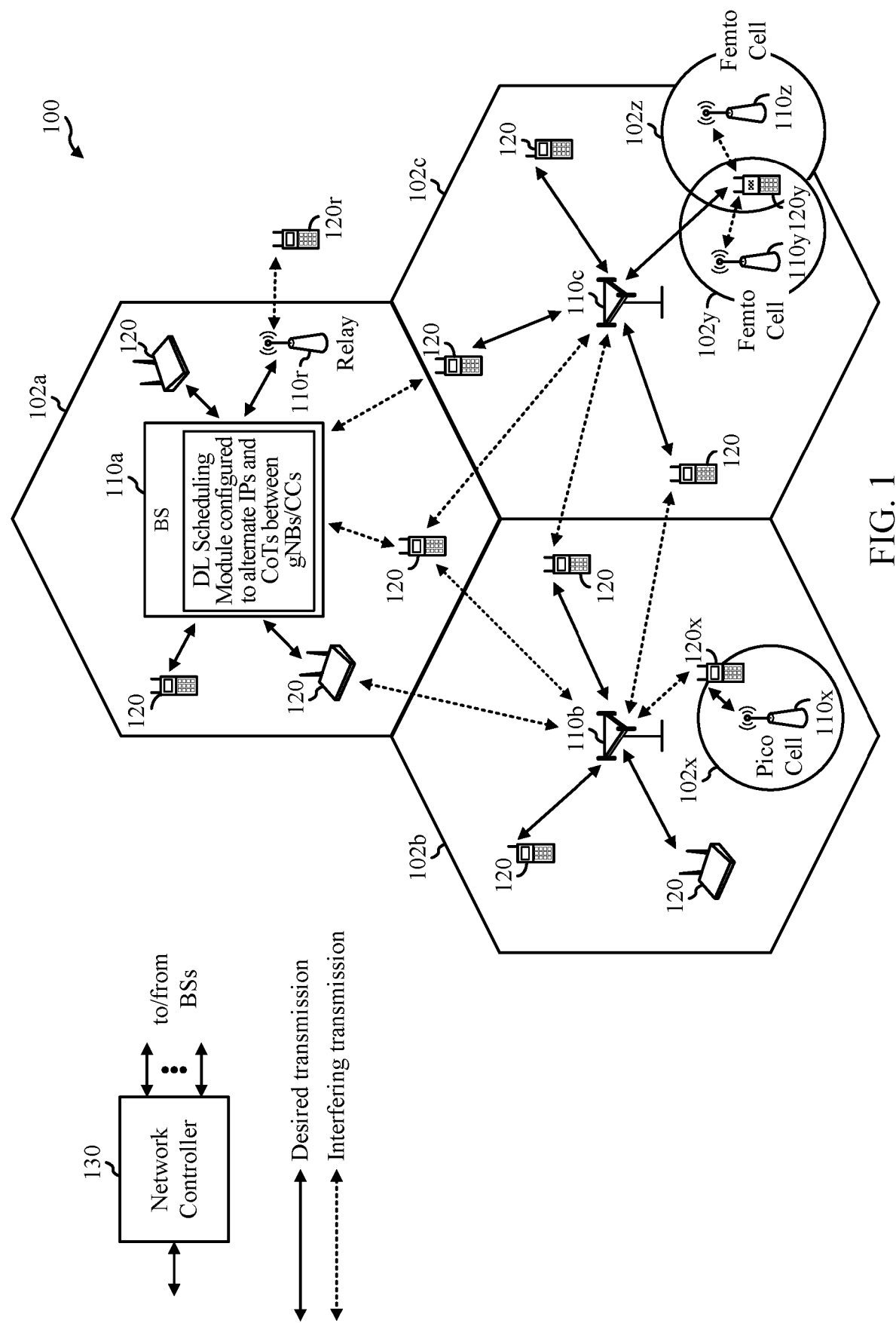
FIG. 1 is a block diagram conceptually illustrating an example telecommunications system, in accordance with certain aspects of the present disclosure.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

With 5G NR, subcarrier spacing may be scaled. The waveforms selected for 5G include cyclic prefix-orthogonal frequency-division multiplexing (CP-OFDM) and DFT-Spread (DFT-S) OFDM. In addition, 5G NR allows for switching between both CP-OFDM and DFT-S-OFDM on the uplink to get the multiple-input multiple-output (MIMO) spatial multiplexing benefit of CP-OFDM and the link budget benefit of DFT-S OFDM. With long term evolution (LTE), orthogonal frequency-division multiple access (OFDMA) communications signals may be used for downlink communications, and Single-Carrier Frequency-Division Multiple Access (SC-FDMA) communications signals may be used for LTE uplink communications. The DFT-s-OFDMA scheme spreads a plurality of data symbols (i.e., a data symbol sequence) over a frequency domain which is different from the OFDMA scheme. In comparison to the OFDMA scheme, the DFT-s-OFDMA scheme can greatly reduce a peak-to-average-power ratio (PAPR) of a transmission signal. The DFT-s-OFDMA scheme may also be referred to as an SC-FDMA scheme.

Scalable OFDM multi-tone numerology is another feature of 5G. Certain versions of LIE supported a mostly fixed OFDM numerology of 15 kHz spacing between OFDM tones (often called subcarriers) and carrier bandwidths up to 20 MHz. Scalable OFDM numerology has been introduced in 5G to support diverse spectrum bands/types and deployment models. For example; 5G NR is able to operate in mmWave (mmW) bands that have wider channel widths (e.g., 100s of MHz) than currently in use in LTE. Also, the OFDM subcarrier spacing is able to scale with the channel width, so the fast Fourier transform (FFT) size scales such that processing complexity does not increase unnecessarily for wider bandwidths: Numerology may refer to the different values different features of a communication system can take such as subcarrier spacing, cyclic prefix, symbol length, FFT size, transmission time interval (TTI), etc.

In 5G NR, cellular technologies have been expanded into the unlicensed spectrum, both stand-alone and licensed-assisted (LAA). In addition, the unlicensed spectrum may occupy frequencies up to 60 GHz (e.g., mmW). The used of unlicensed bands provides added capacity.

An example of an unlicensed technology is LTE Unlicensed (LTE-U). By aggregating LIE in unlicensed spectrum with an 'anchor' channel in licensed spectrum, faster downloads are enabled for customers. LIE-U shares the unlicensed spectrum fairly with Wi-Fi. This is an advantage because in the 5 GHz unlicensed band where Wi-Fi devices are in wide use, it is desirable for LTE-U to coexist with the Wi-Fi. However, an LTE-U network may cause RF interference to an existing co-channel Wi-Fi device. Choosing a preferred operating channel and minimizing the interference caused to nearby Wi-Fi networks is a goal for LTE-U devices. However, the LTE-U single carrier (SC) device may operate on the same channel as Wi-Fi if all available channels are occupied by Wi-Fi devices. To coordinate spectrum access between LTE-U and Wi-Fi, the energy across the intended transmission band is detected. This energy detection (ED) mechanism informs the device of ongoing transmissions by other nodes. Based on this ED information, a device decides if it should transmit. Wi-Fi devices do not back off to LTE-U unless its interference level is above an ED threshold (e.g., −62 dBm over 20 MHz). Thus, without proper coexistence mechanisms in place, LTE-U transmissions could cause considerable interference on a Wi-Fi network relative to Wi-Fi transmissions.

Licensed Assisted Access (LAA) is another example of unlicensed technology. Like LTE-U, LAA uses an anchor channel in licensed spectrum. However, LAA also adds "listen before talk" (LBT) to the LIE functionality. A gating interval may be used to gain access to a channel of a shared spectrum. The gating interval may determine the application of a contention-based protocol such as an LBT protocol. The gating interval may indicate when a Clear Channel Assessment (CCA) is performed. Whether a channel of the shared unlicensed spectrum is available or in use is determined by the CCA. If the channel is "clear" for use, i.e., available, the gating interval may allow the transmitting apparatus to use the channel. Access to the channel may be for a predefined transmission interval. Thus, with unlicensed spectrum, the LBT procedure is performed before transmitting a message. If the channel is not cleared for use, then a device will not transmit.

Another example unlicensed technology is LTE-WLAN Aggregation (LWA). DATA which utilizes both LTE and Wi-Fi. Accounting for both channel conditions, LWA can split a single data flow into two data flows which allows both the LIE and the Wi-Fi channel to be used for an application, Instead of competing with Wi-Fi, the LIE signal is using the WLAN connections seamlessly to increase capacity.

Another example of unlicensed technology is MulteFire. MulteFire opens up new opportunities by operating 4G LIE technology solely in unlicensed spectrum such as the global 5 GHz. Unlike LTE-U and LAA, MulteFire allows entities without any access to licensed spectrum. Thus, MulteFire operates in unlicensed spectrum on a standalone basis, that is, without any anchor channel in the licensed spectrum. MulteFire differs from LTE-U, LAA, and LWA because those technologies aggregate unlicensed spectrum with an anchor in licensed spectrum. Without relying on licensed spectrum as the anchoring service. MulteFire allows for Wi-Fi like deployments. A MulteFire network may include access points (APs) and/or BSs communicating in an unlicensed radio frequency spectrum band (e.g., without a licensed anchor carrier).

DRS (discovery reference signal) Measurement Timing Configuration (DMTC) is a technique that allows MulteFire to transmit with minimal interference to other unlicensed technology including Wi-Fi. The periodicity of discovery signals is very sparse. This allows MulteFire to access channels occasionally, transmit discovery and control signals, and then vacate the channels. Since the unlicensed spectrum is shared with other radios of similar or dissimilar wireless technologies, a LBT procedure is applied for channel sensing. LBT involves sensing the medium for a predefined minimum amount of time and backing off if the channel is busy. Therefore, the initial random access (RA) procedure for standalone LTE-U should involve as few transmissions as possible and also have low latency, such that the number of LBT operations can be minimized and the RA procedure can then be completed as quickly as possible.

Leveraging a DMTC window, MulteFire algorithms search and decode reference signals in unlicensed band from neighboring BSs in order to know which BS may be best for serving the user. As the caller moves past one BS, the caller's UE sends a measurement report, triggering a handover at the right moment, and transferring the caller (and all of their content and information) to the next BS.

Since LTE traditionally operated in licensed spectrum and Wi-Fi operated in unlicensed bands, coexistence between LTE and Wi-Fi or other unlicensed technology was not considered when LTE was designed. In moving to the unlicensed world, the LTE waveform was modified and algorithms were added in order to perform LBT. This respects unlicensed incumbents, including Wi-Fi, by not just acquiring a channel and immediately transmitting. The present example supports LBT and the detection and transmission of WCUBS (Wi-Fi Channel Usage Beacon Signal) for ensuring coexistence with Wi-Fi neighbors. MulteFire was designed to "hear" a neighboring Wi-Fi BS's transmission (because Wi-Fi uses only unlicensed spectrum). MulteFire listens first, and autonomously makes the decision to transfer when there is no other neighboring Wi-Fi transmitting on the same channel. This technique ensures co-existence between MulteFire and Wi-Fi. Additionally, MulteFire may adhere to the unlicensed rules and regulations set by 3GPP and the European Telecommunications Standards Institute (ETSI), which mandates the −72 dBm LBT detection threshold. This further helps de-conflict with Wi-Fi. MulteFire's LBT design may be identical to the standards defined in 3GPP for LAA and/or enhanced LAA (eLAA) and may comply with ETSI rules.

An expanded functionality for 5G involves the use of 5G NR Spectrum Sharing (sometimes referred to as NR-SS), 5G NR-SS enables enhancement, expansion, and upgrade of the spectrum sharing technologies introduced in LTE, such as LWA, LAA, eLAA, Citizen Broadband Radio Service (CBRS), and/or License Shared Access (LSA).

Aspects of the disclosure are described in the context of a wireless communication system. Aspects of the disclosure are then illustrated by and described with reference to apparatus diagrams, system diagrams, and flowcharts.

FIG. 1 illustrates an example wireless communication network 100 in which aspects of the present disclosure may be performed. For example, wireless communication network 100 may be a 5G NR network. A BS 110a in the wireless communication network may perform downlink scheduling of transmission to at least one UE 120 in the wireless communication network 100, by alternating Idle Periods (IPs) and Channel Occupancy Times (CoTs), such as in a frame based equipment (FBE) fixed frame, with at least one other BS 110 in the wireless communication network 100 that is synchronized with the first BS 110a and/or between different component carriers (CCs) used by the BS 110a. The BS 110a may communicate with the UE 120 based on the downlink scheduling. As shown in the FIG. 1, the BS 110a includes a DL Scheduling Module configured to alternate the IPs and CoTs between synchronized BSs and/or CCs.

As illustrated in FIG. 1, the wireless communication network 100 may include a number of BSs 110 and other network entities. A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, gNB, access point (AP), distributed unit (DU), or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a tone, a subband, a frequency channel, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cells. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having an association with the femto cell (e.g., UEs in a Closed Subscriber Group (CSG), UEs for users in the home, etc.). A BS 110 for a macro cell may be referred to as a macro BS 110. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, an appliance, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs may be considered as Internet-of-Things (IoT) devices, which may be narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs) and the other UEs may utilize the resources scheduled by the UE for wireless communication. In some examples, a UE may function as a scheduling entity in a peer-to-peer (P2P) network and/or in a mesh network. In a mesh network example, UEs may communicate directly with one another in addition to communicating with the scheduling entity.

Figure 2:
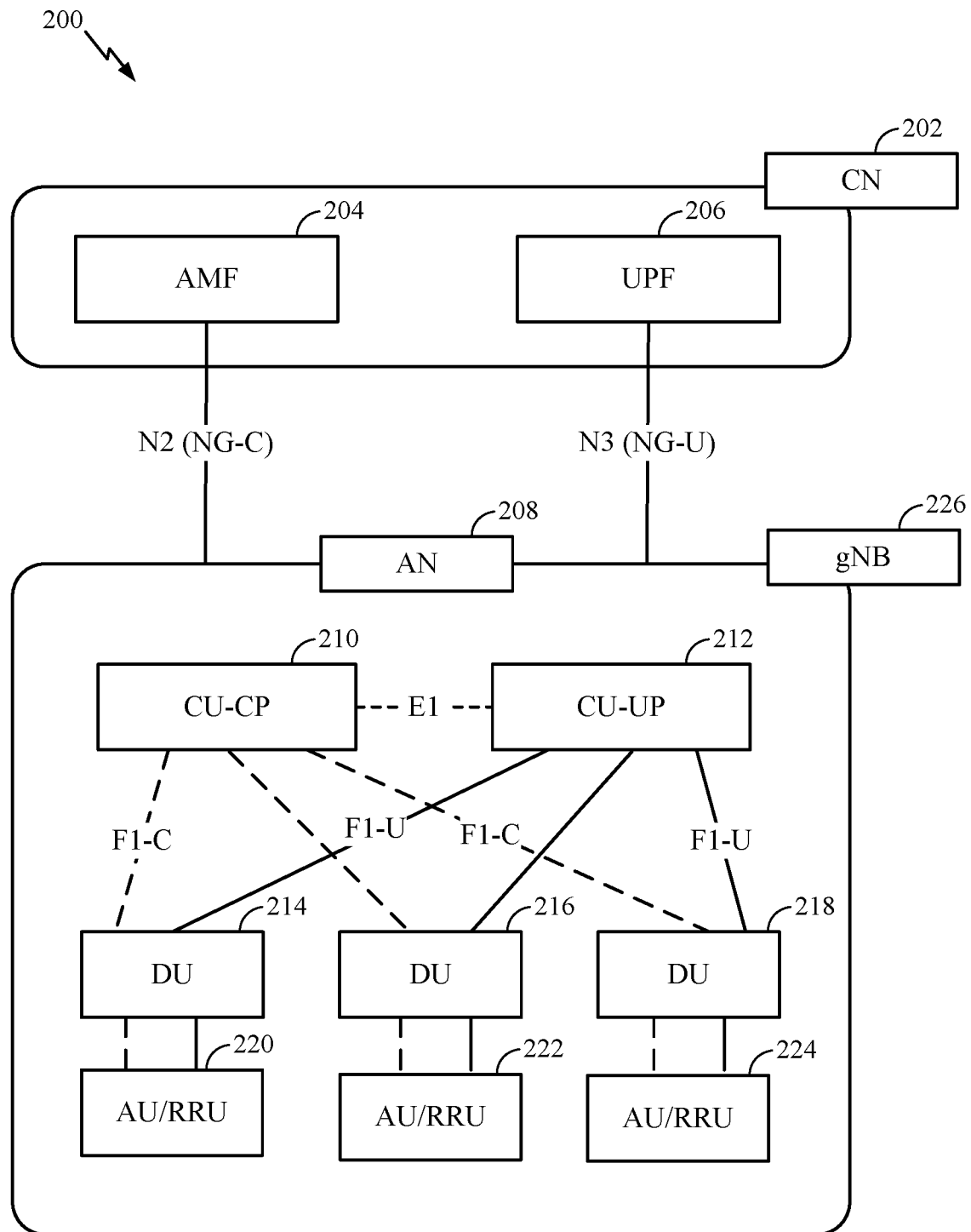
FIG. 2 is a block diagram illustrating an example architecture of a distributed radio access network (RAN), in accordance with certain aspects of the present disclosure.

FIG. 2 illustrates an example architecture of a distributed radio access network (RAN) 200, which may be implemented in the wireless communication network 100 illustrated in FIG. 1. As shown in FIG. 2, the distributed RAN 200 includes Core Network (CN) 202 and Access Node (AN) 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE). The CU-UP(s) 212 may be connected to the CU-CP 210. For example, the DU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, and Physical (PHY) layers, and/or Radio Frequency (RF) layers may be adaptably placed in the AN and/or UE.

Figure 3:
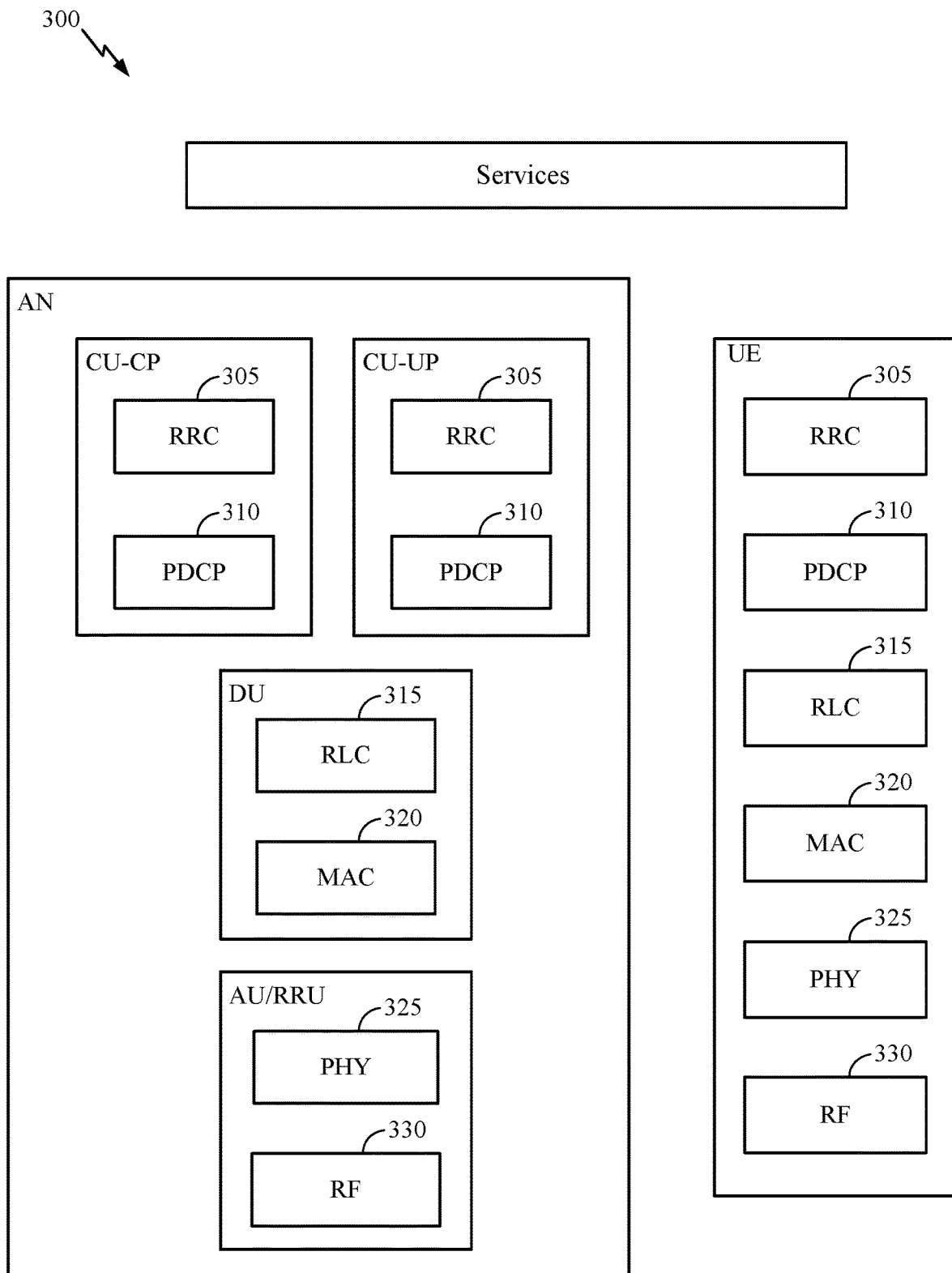
FIG. 3 is a block diagram illustrating an example physical architecture of a distributed RAN, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer. The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
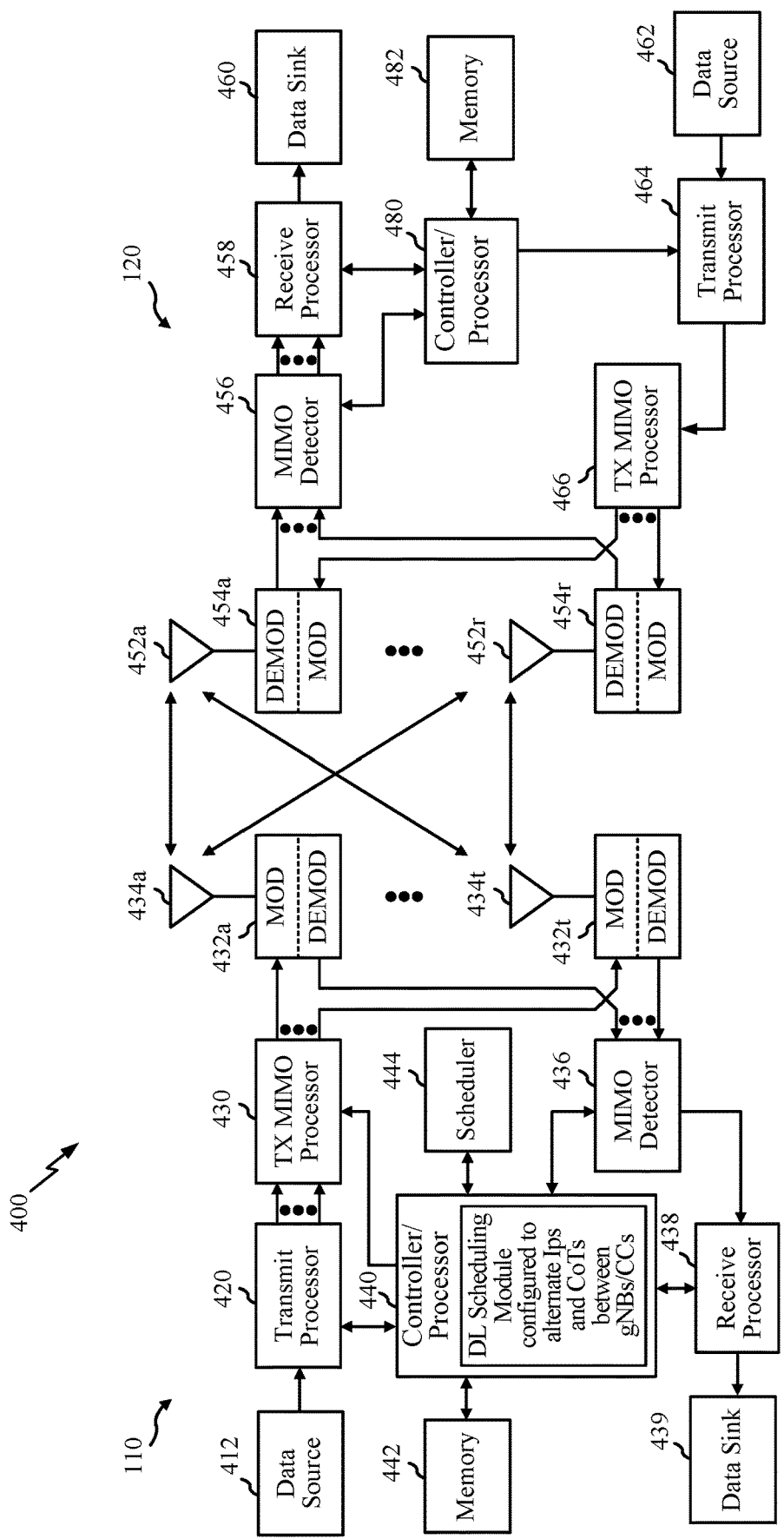
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in the wireless communication network 100 in FIG. 1, which may be used to implement aspects of the present disclosure. One or more components of the BS 110 and UE 120 may be used to practice aspects of the present disclosure. For example, antennas 452, processors 466, 458, 464, and/or controller/processor 480 of the UE 120 and/or antennas 434, processors 460, 420, 438, and/or controller/processor 440 of the BS 110 may be used to perform the operations described herein. As shown in FIG. 4, the Controller/Processor 440 of the BS 110 may have downlink scheduling module configured to alternate IPs and CoTs between different synchronized gNBs and/or different CCs used by the BS 110. In some examples, the downlink scheduling module be located in the Scheduler 444 of the BS 110, or in another component of the BS 110.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in DUs. For example, some Tx/Rx processing can be done in the central unit (CU), while other processing can be done at the DUs. For example, in accordance with one or more aspects as shown in the diagram, the BS mod/demod 432 may be in the DUs.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
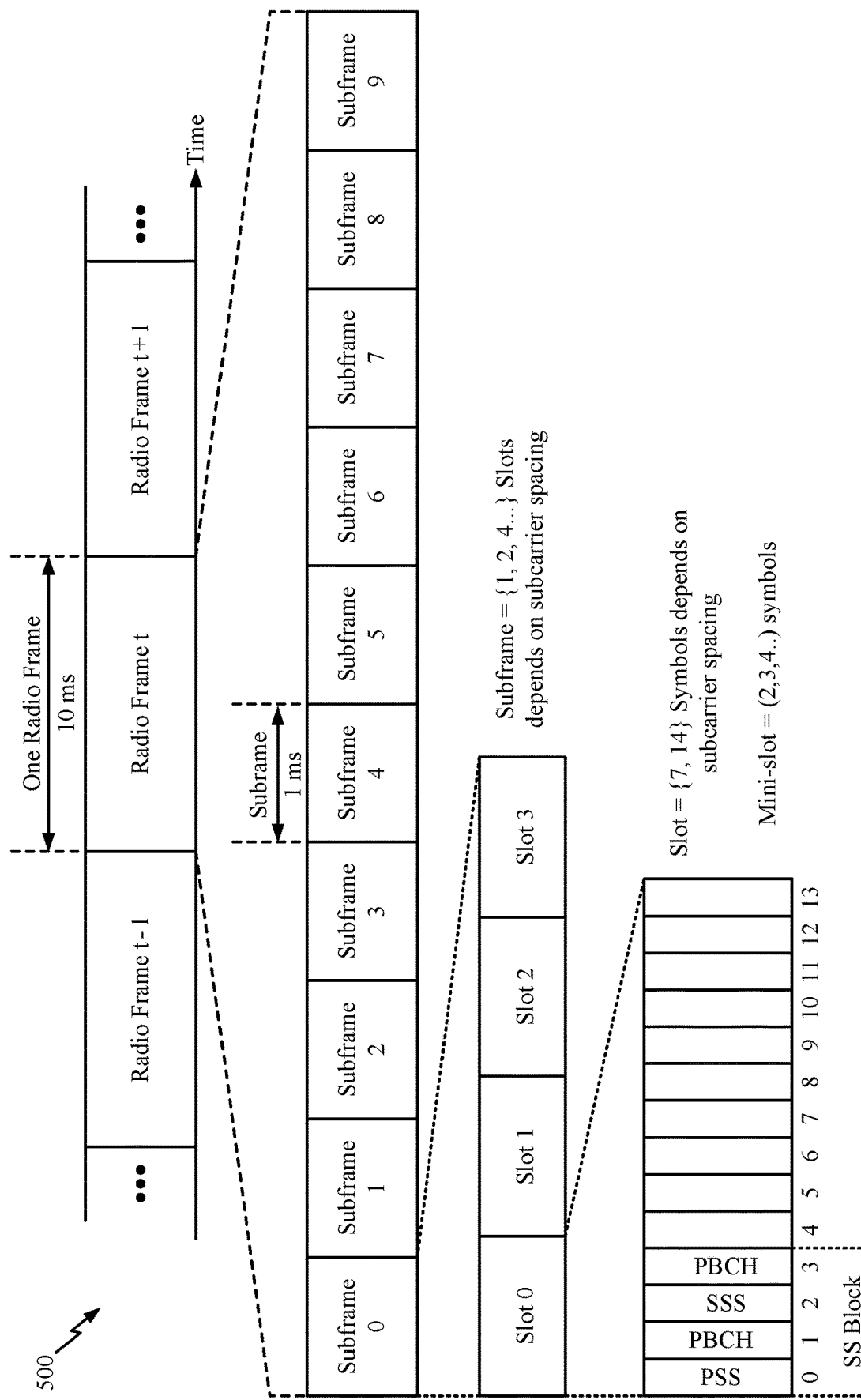
FIG. 5 is a block diagram illustrating an example of a frame format for a telecommunication system, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 6:
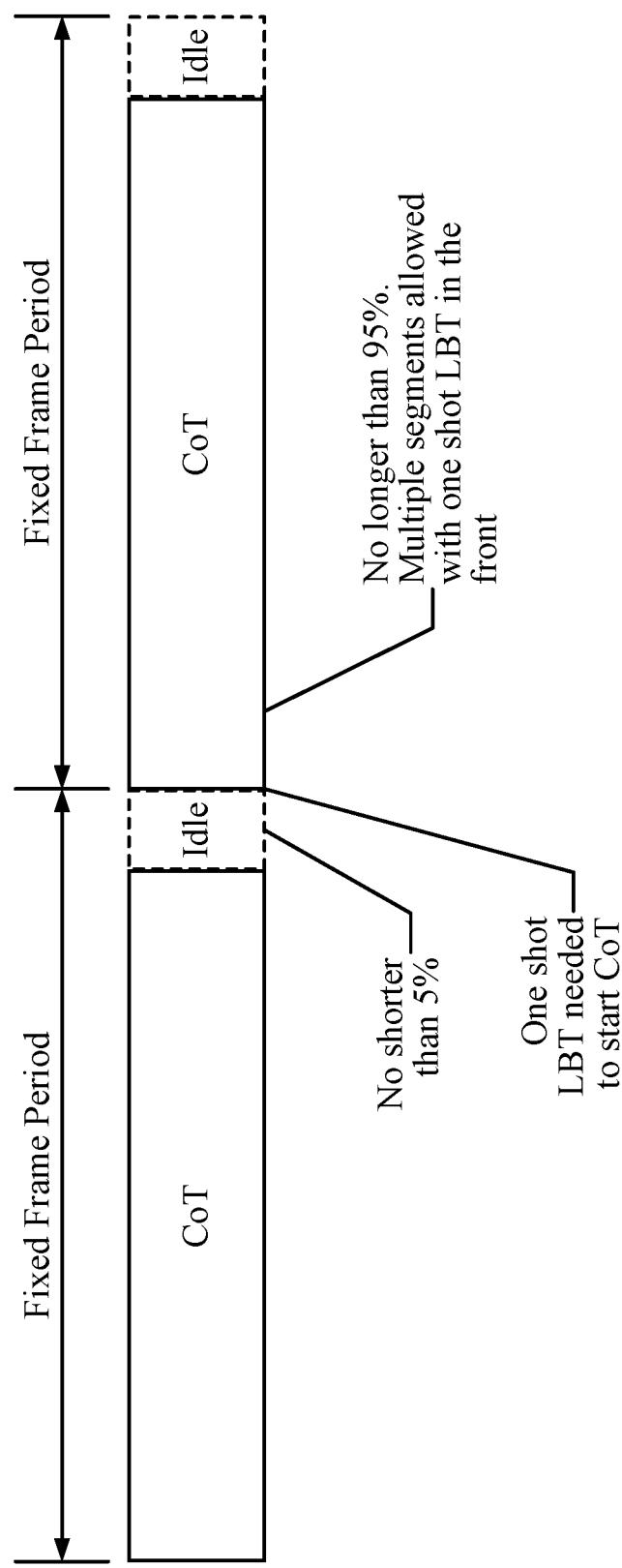
FIG. 6 which shows an inter-frame idle period for a single carrier and a single node, in accordance with certain aspects of the present disclosure.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Example Transmission Diversity for FBE Idle Period Handling

Frame based equipment (FBE) has been proposed, for example, for industrial Internet-of-Things (IoT) applications. In the unlicensed band, equipment is classified into one of two modes, FBE or load based equipment (LBE). In one example, the FBE is a gNodeB (gNB) or distributed unit (DU), which may also be called a base station (B S).

For industrial IoT applications, the environment may be a single operator environment, but may also be a multiple operator environment. The FBE may be configured with periodic frames and with an idle period between the periodic frames. The FBE may be configured to perform a listen before talk (LBT) check in an LBT procedure before starting transmissions on a shared medium. If FBE determined during the LBT procedure that the channel is clear, the FBE may transmit and occupy the channel for a fixed time period. If, instead, the FBE finds the channel occupied, then for the next fixed frame period the FBE does not transmit on the medium.

Regulation calls for a minimum inter-frame idle period equal to a maximum (e.g., the larger of) of 100 µs or five percent (5%) of the frame (e.g., max(100 µs, 5% of frame length)). FIG. 6 shows an example inter-frame idle period (IP) for a single carrier (e.g., a single component carrier (CC)) and a single BS. As shown in FIG. 6, each fixed frame period includes an idle period and a channel occupancy time (CoT). Idle periods are overhead during which signals are not transmitted. In some examples, idle periods may be reduced to improve system efficiency. The total time that an FBE transmits on a channel without evaluating the availability of that channel is referred to as the channel occupancy time (CoT). After the CoT lapses, the FBE remains silent and waits for a short time referred to as the Idle Period. At the end of an IP, and prior to starting a new fixed frame (e.g., a new CoT), the FBE performs a LBT procedure. During the LBT procedure, the FBE detects energy across the intended transmission band. The presence or absence of detected energy informs the FBE of ongoing transmissions by other nodes. Based on the detection of ongoing transmission, the FBE decides if it should transmit in the next frame period. For example, if the detected energy is above an energy detection threshold, the FBE waits for a subsequent frame (i.e., a later frame than the frame period following the current idle period) to transmit.

In some examples, a component is a carrier (e.g., used by the same BS). In some examples, a component is a cell (e.g., a BS, gNB, DU on the same or on a different frequency). In some cases, the FBE schedules UE(s) to switch to a different component (e.g., different cell or carrier) of a subsequent fixed frame period before the regulatory idle period is over. In such a scenario, where the UE is a responding device, and not a transmission initiating device, the UEs may not experience an idle period. From a single-carrier UE perspective, there would never be an idle interval on the downlink (DL).

Figure 7:
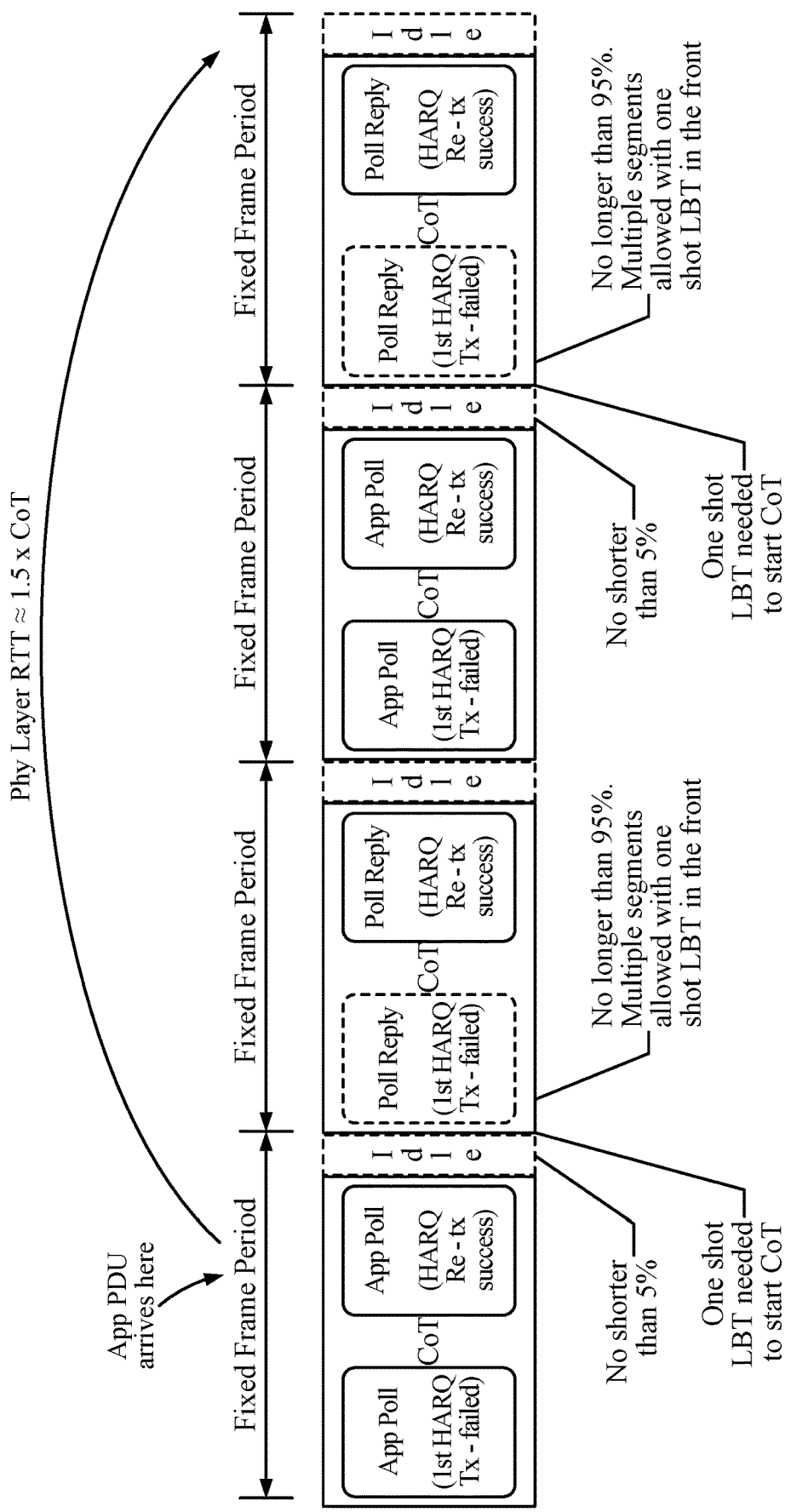
FIG. 7 illustrates downlink and uplink transmissions and retransmissions for an Internet-of-Things (IoT) application with strict latency limits, in accordance with certain aspects of the present disclosure.

In some examples, to minimize overhead, the FBE may use a CoT of 2 ms (milliseconds). If the FBE has to schedule around IPs, the flexibility of UL/DL scheduling and partitioning may be reduced. This leads to a latency caused by waiting for the next DL scheduling opportunity and skipping over unused UL scheduling slots. It would be preferable if the gNB was able to schedule DL/UL grants whenever necessary, rather than tethering them around IP gaps. FIG. 7 illustrates DL and UL transmissions and retransmissions for an IoT application with strict latency limits. As shown in FIG. 7, with an application protocol data unit (PDU), a controller device polls the FBE and the FBE responds. The application ("app") poll is a DL transmission to the UE and the poll reply is a UL transmission by the UE.

Figure 8:
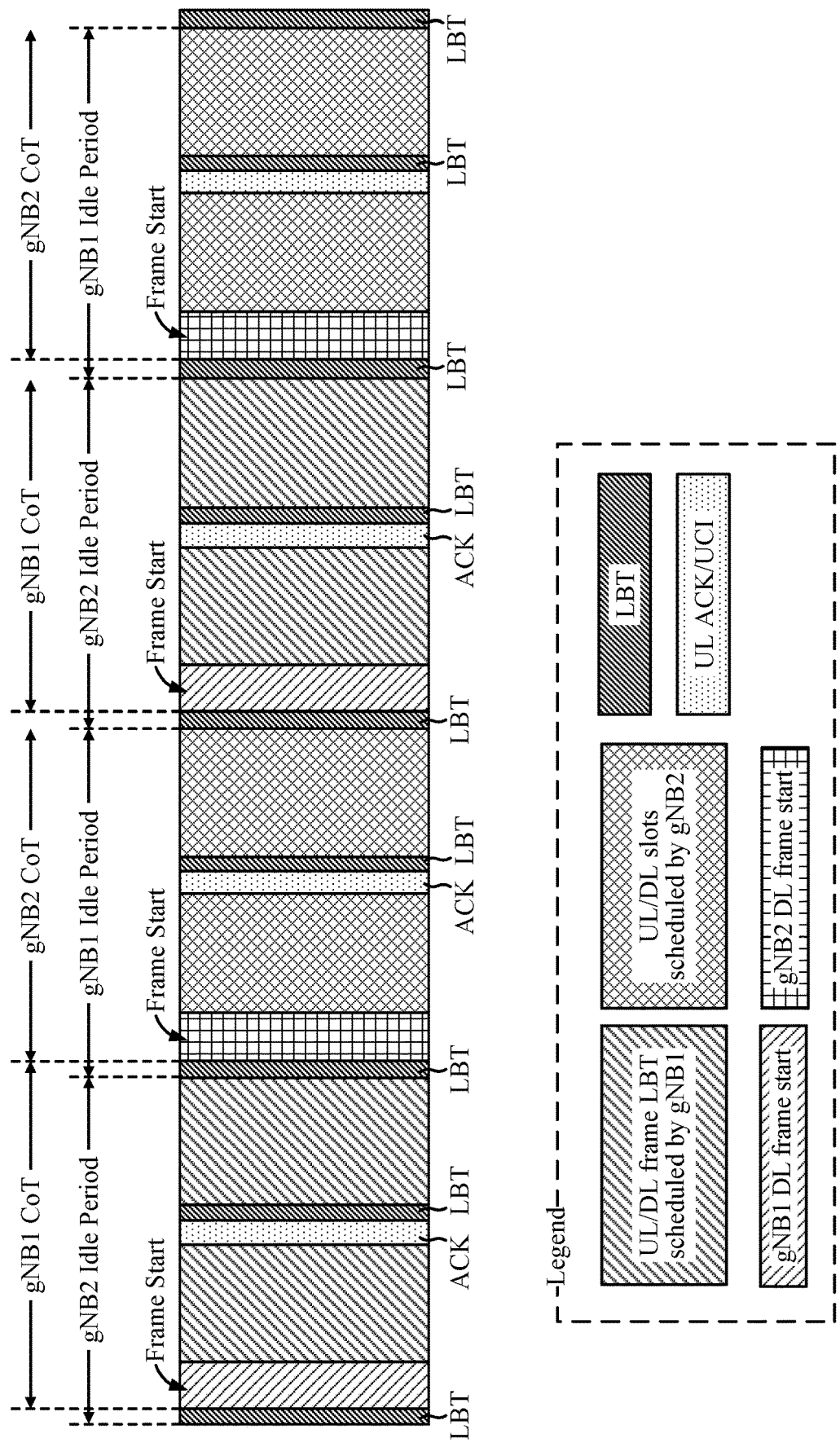
FIG. 8 shows two gNodeBs (gNBs) alternating channel occupancy times (CoTs) and Idle Periods (IPs), in accordance with certain aspects of the present disclosure.

According to certain aspects, to reduce overhead caused by idle period time, multiple transmitters such as two (or more) synchronized BSs (e.g., gNBs) are employed to ensure full DL scheduling. The synchronized gNBs alternate between IP and CoT every fixed frame period. As shown in FIG. 8, the two gNBs (gNB1 and gNB2) alternate CoTs and IPs. In this case, gNB1 schedules CoT for transmission during the scheduled IP for the gNB2, and the gNB1 schedules its IP during at least a portion of the CoT for the gNB2. In some examples, the gNBs are distributed units (DUs) with a shared central unit (CU).

The IP per gNB may be larger than 5%, so full schedule utilization is possible. The gNB1 and gNB2 time share proportion of the CoT may be flexible. FIG. 8 illustrates an equal CoT time share between gNB1 and gNB2. On the UL slots, full CoMP is possible. On the DL slots, CoMP set is possible. In some examples, the gNB, instead of being idle, during the other gNB's CoT transmission, the gNB can be mostly idle. For example, the gNB may still transmits CSI-RS prior to aligning gaps provided the gNB performs a short CCA just before the start of transmission and the gNB has transmitted previously on its corresponding frame.

When one transmitter occupies the timeline the whole time, no transmission will occur during an IP (e.g., as required by regulation). With multiple transmitters, the timeline is occupied the whole time. If one transmitter is in an IP, the other transmitter can be transmitting during a CoT. In FIG. 8, two gNBs are illustrated, gNB1 and gNB2. The gNBs can also be referred to as DU1 and DU2. As shown, when gNB1 is in an IP, gNB2 is transmitting during a CoT and vice versa. The frames where gNB2 is transmitting during a COT are represented with vertical lines. The frames where gNB1 is transmitting during a COT are represented with horizontal lines. The times when uplink control information (UCI), such as hybrid automatic repeat request (HARD) acknowledgments (ACK), is sent are represented by a time period labeled ACK. The time when an LBT procedure is performed is represented by a time period labeled LBT.

Each time a transmitter (e.g., DU or gNB) switches (alternates) with another transmitter, an LBT may be done. The LBT may be shorter in duration than an IP. Thus, the LBT may take up less overhead. For example, the LBT may take 25 µs, while an IP may last 100 µs. As shown in FIG. 8, an LBT may be performed between a transmission and an acknowledgement. An acknowledgement can occur a few OFDM symbol durations after a downlink transmission. In some examples, the frequencies (e.g., CCs used by the alternating transmitters) are the same and the transmitters are switched/alternated. In some examples, the transmitted are considered remote units that are part of a remote stack controlled by a central unit (CU).

In CoMP, multiple transmission points (e.g., BSs and/or UEs) may coordinate to better serve a UE on a downlink and/or uplink. For example, transmission points may coordinate to reduce interference (e.g., with some transmission points restricting transmission during times others are to transmit). Multiple transmission points may also transmit simultaneously to achieve higher transmit power. Multiple transmission points may coordinate to serve a UE separately or simultaneously on the uplink. Even if one link from one transmission weakens, the other links may be strong enough to ensure the UE remains in coverage. By adding a space factor, a wider MIMO matrix can be created.

Figure 9:
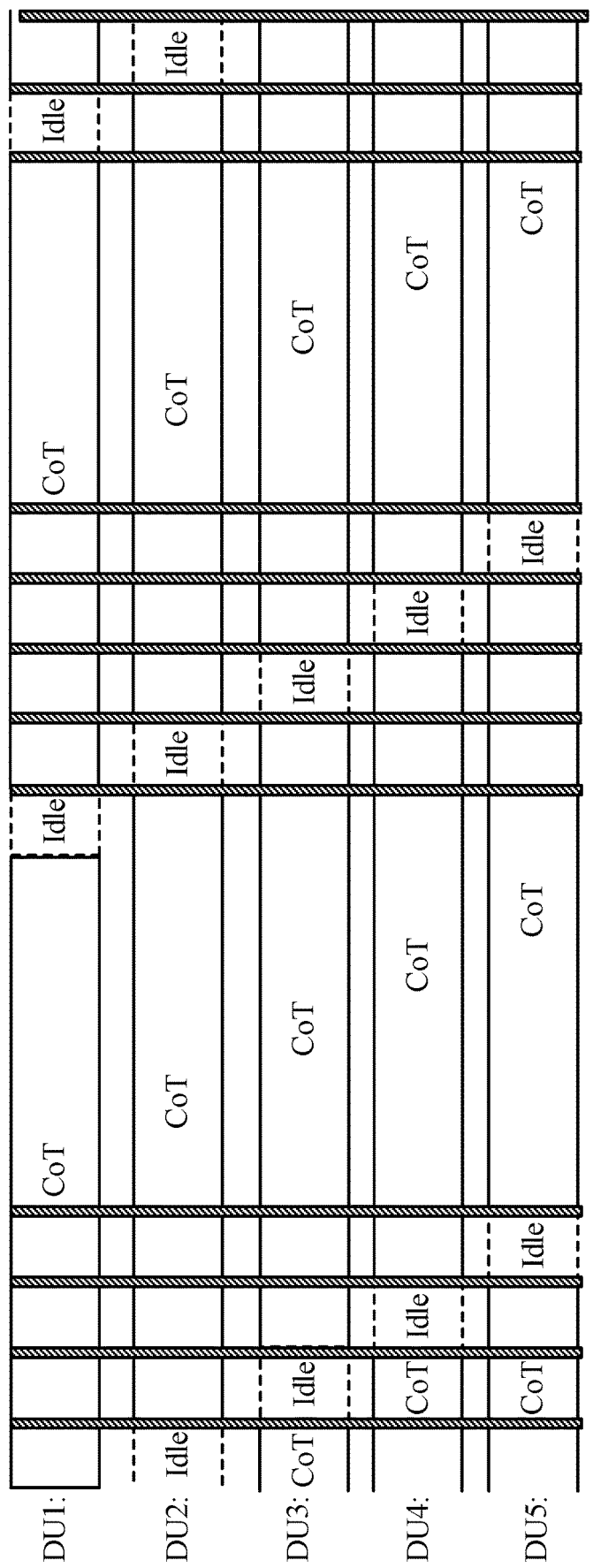
FIG. 9 illustrates five distributed units (DUs) arranged as a coordinated multipoint (CoMP) of DUs with staggered IPs, in accordance with certain aspects of the present disclosure.

If CoMP is used, the number of deployed gNBs can asymptotically approach the number needed without the IP regulation (e.g., by 5%, ~105% (1/0.95)). In a group of twenty (20) CoMP DUs, one DU is idle (on the DL) at any given time, while the other DUs occupy CoT. FIG. 9 illustrates five DUs arranged as a CoMP of DUs with staggered IPs. From the UE perspective, there is one continuous waveform comprising DU1 to DU5 all on the same carrier. With a maximum channel occupancy time (MCoT) =10 ms, and an IP that lasts 500 µs, a LBT alignment may be taken every 500 µs. The LBT alignment may use the existing LBT alignment occasions to reduce overhead. For example, with 500 µs IP*60 kHz, then with 30 symbols at least two slots can be scheduled in each direction before an LBT alignment is needed. A "CoT declaration" signal may be used when DL signals are needed in the NR structure after LBT (e.g. PDCCH with DL or UL grants).

Figure 10:
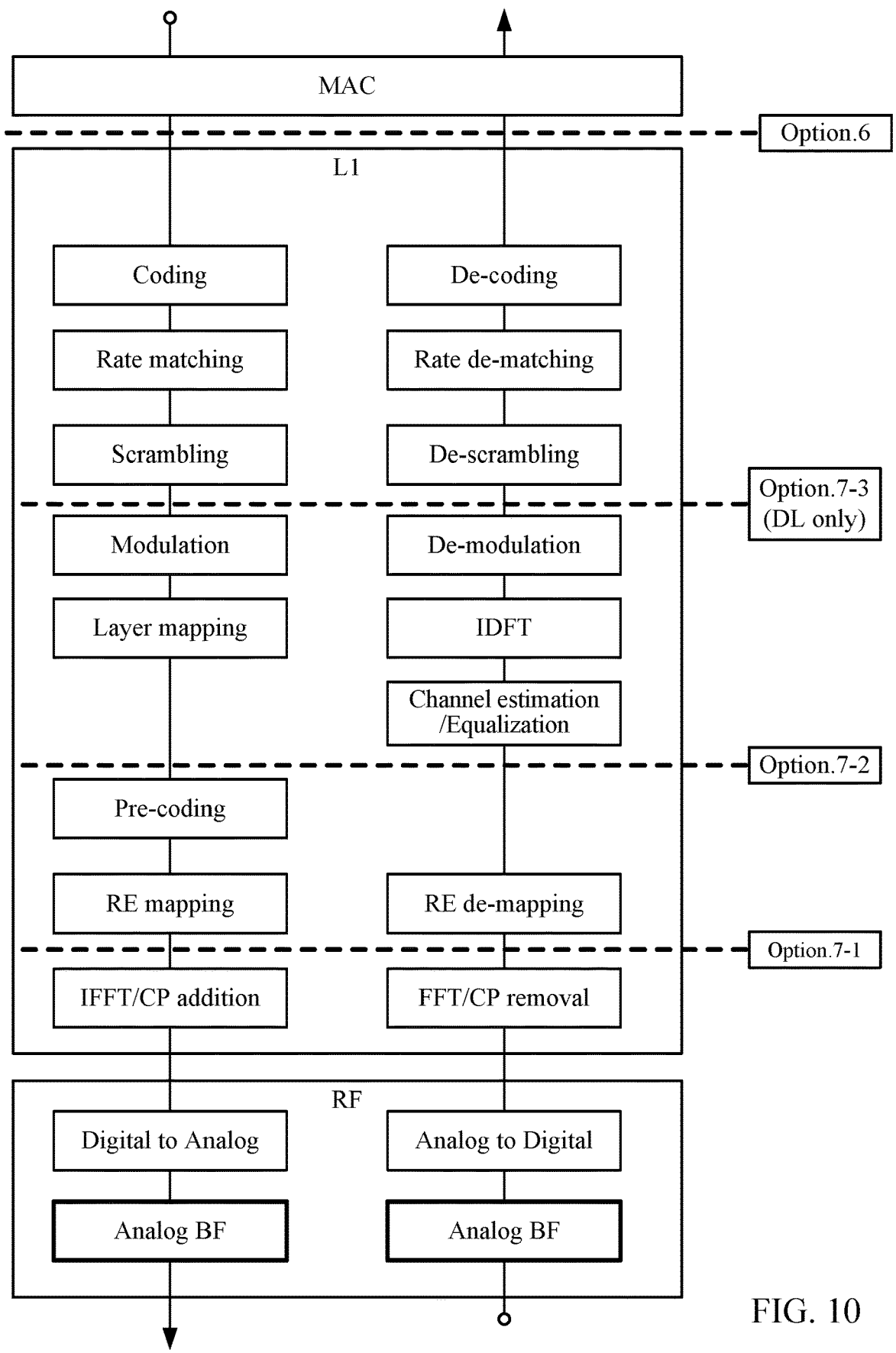
FIG. 10 illustrates example control unit (CU)/DU split architectures, in accordance with certain aspects of the present disclosure.

FIG. 10 illustrates examples of CU/DU split architectures. The CU/DU split may be selected to maximize scheduling flexibility, including handling HARQ retransmissions among DUs. A flexible frame structure enables handling of traffic transmissions across multiple DUs. For retransmissions, it may be preferred that a PHY layer is shared between the transmitting and retransmitting DUs. Transmitting devices generate transmission blocks. If one of the DUs sends a transmission block to the UE, the CU can quickly retransmit that transmission block to another DU. The CU may not be a high layer so it is close enough for the CU to generate a transmission block. For example, the CU may be at the medium access control (MAC) layer. HARQ retransmissions are generated at the MAC layer and transmitted at the PHY layer (layer 1). The Layer 1 may be part of the DUs. The split may be between the PHY/MAC layers or somewhere in the PHY layer.

As discussed above, different transmitting devices can alternate IPs and CoTs, where, for example, a BS (e.g., DU or gNB) transmits (scheduled CoT) during the IP of another BS, and idles during at least a portion of the other BSs CoT. According to certain aspects, additionally or alternatively, a downlink switch is may be between component carriers (CCs). In this case, the transmitting device (BS, DU, gNB) alternates CoTs and IPs between different CCs used by the transmitting device. For example, the BS schedules UEs on carrier 1 for CoT when carrier 2 is in IP and schedule UEs on carrier 2 for CoT when carrier 1 is in an IP. In some examples, the transmitters are not switched. From the UE perspective, the BS alternates CoTs on different carriers. The BS can initiate a regulatory IP, while the UE is switched away, but not necessarily the entire time. It can be the same or different DUs on the different carriers.

Figure 11:
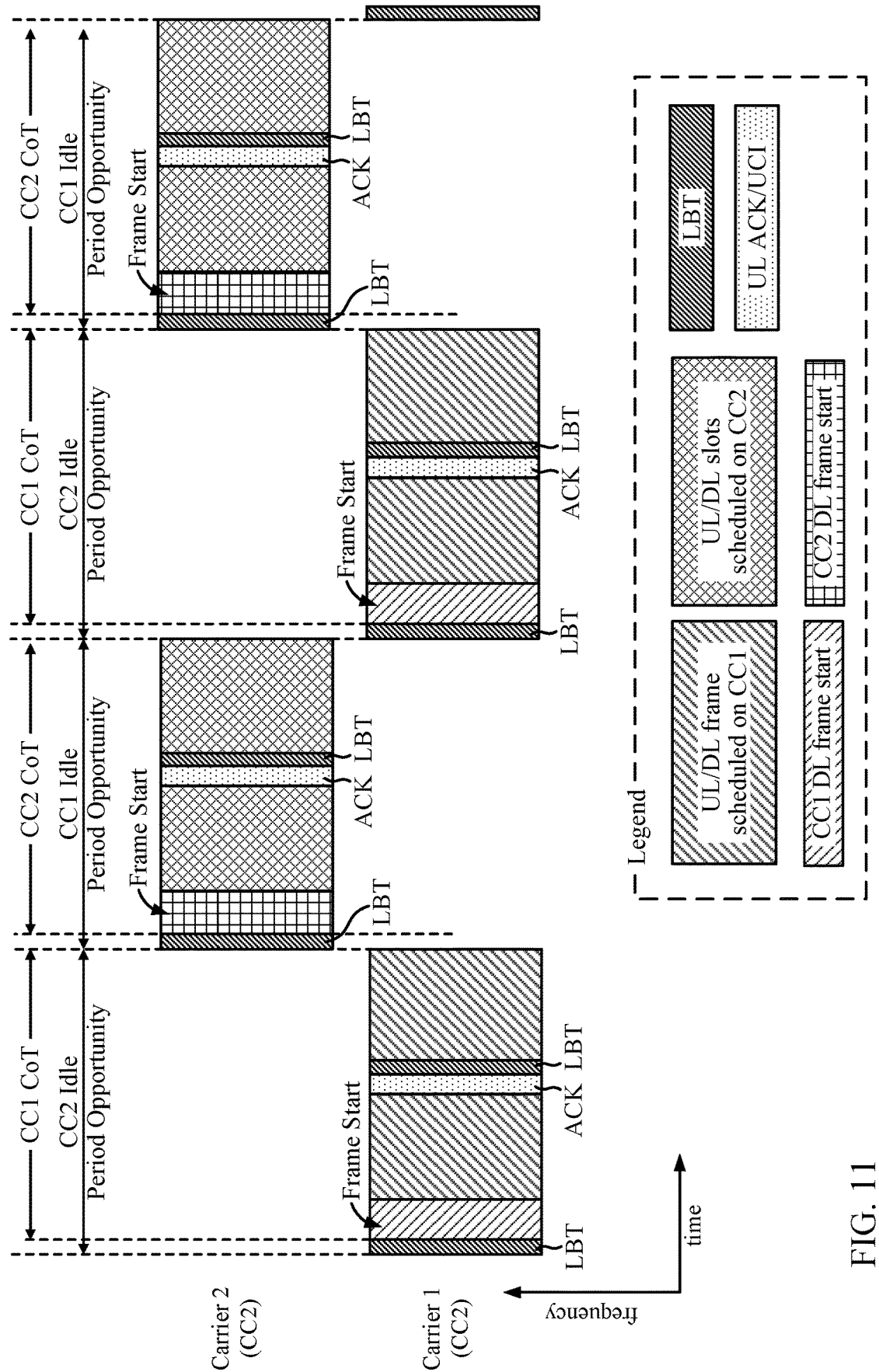
FIG. 11 which shows two component carriers (CCs) with alternating CoTs and IPs, in accordance with certain aspects of the present disclosure.

The sharing of the CoT between CCs (e.g., the percentage split of CoT) may be flexible. FIG. 11 shows CCs with equal time shares. In some examples, the time share is 95% of the CoT on the primary carrier, and 5% of the CoT on the secondary carrier. In some examples, the time shared is 70% on the primary carrier and 30% on the secondary carrier. Other time shared may be used than these examples. On UL slots, full CoMP is possible. On the DL slots, full CoMP is possible. For both directions, sufficient sounding occasions may be ensured. FIG. 11 shows two CCs (CC1 and CC2) and alternating CoTs and IPs between the two CCs. The frames where CC2 is the frequency transmitted during a CoT is represented with vertical lines. The frames where CC1 is the frequency transmitted during a COT is represented with horizontal lines. The time when a UL ACK/UCI is sent is represented by a time period labeled ACK. The time when an LBT procedure is performed is represented by a time period labeled LBT.

Figure 12:
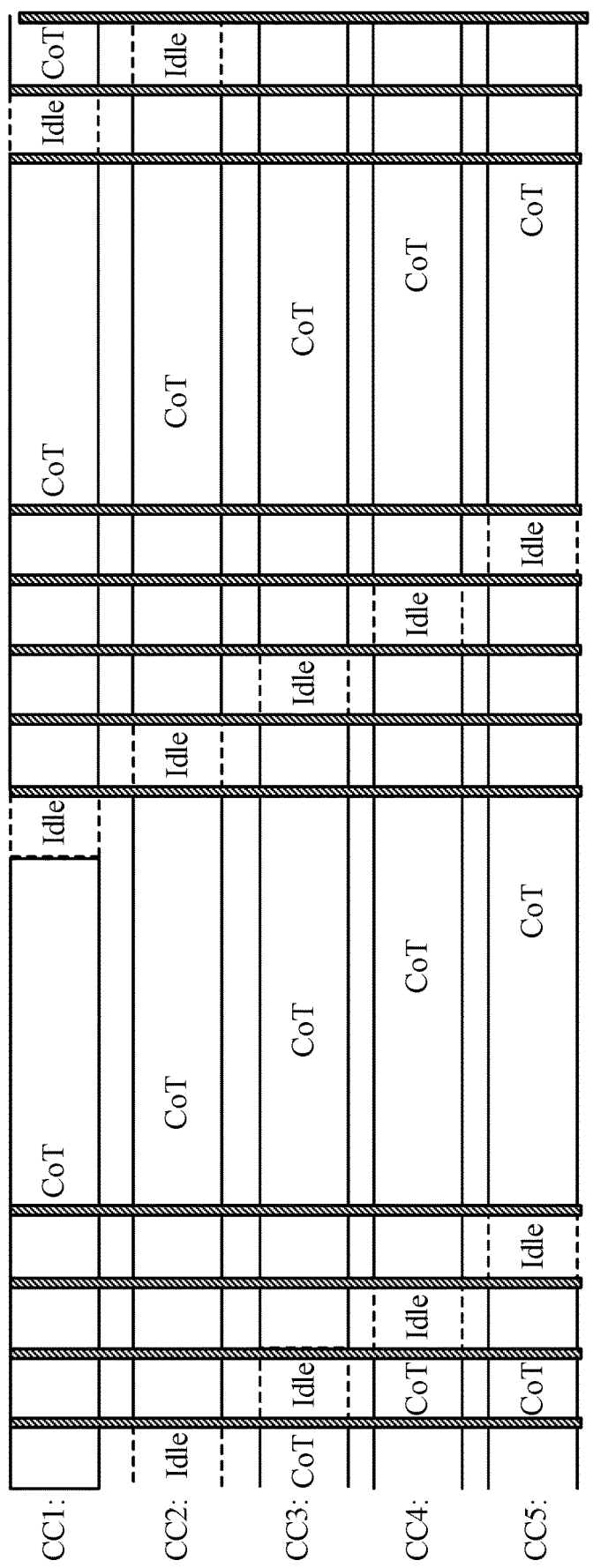
FIG. 12 illustrates a DU with five CCs staggered in frequency, in accordance with certain aspects of the present disclosure.

In some examples, the spectrum utilization may be maximized. Only a minimum IP may be needed on any one single CC for a given DU, FIG. 12 illustrates a DU with five CCs that are staggered in frequency. From the UE perspective, the UE is scheduled to switch to another carrier prior to the start of the IP on the current carrier. Thus, the UE does not see an idle time. Whenever the UE needs to be scheduled for a transmission, there will always be a carrier for it to be scheduled on.

Figure 13:
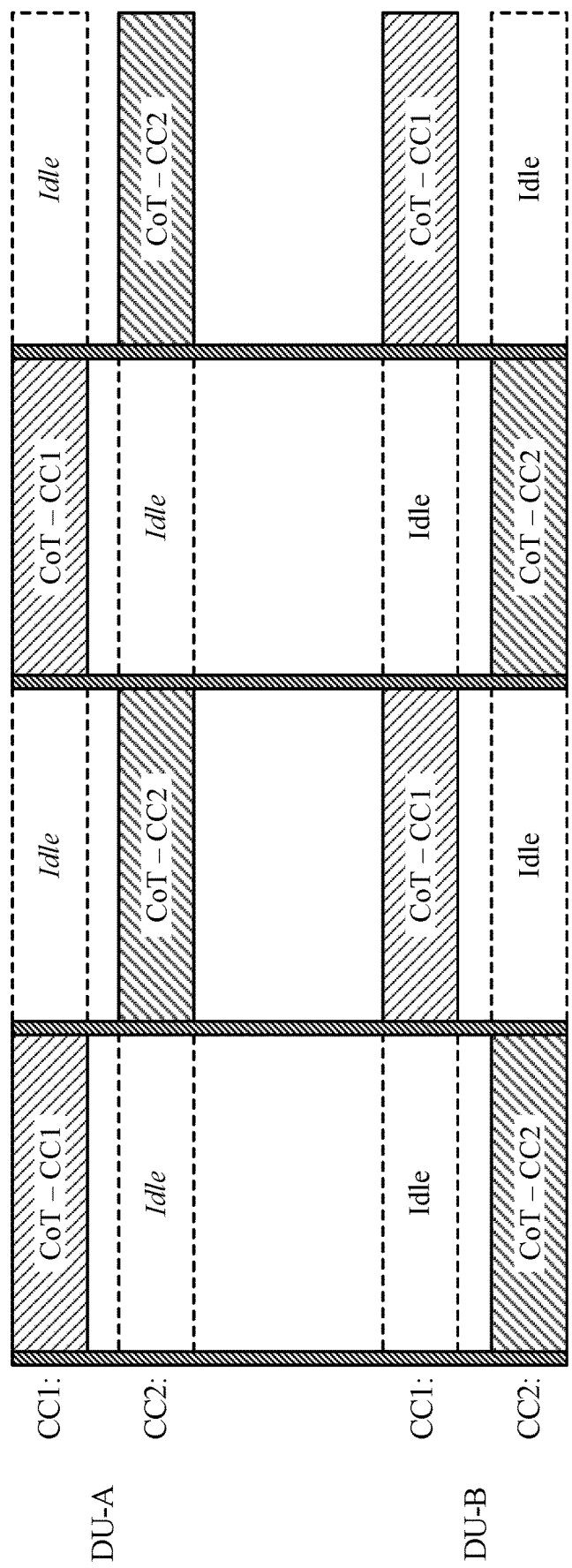
FIG. 13 illustrates multiple-transmitter multiple-carrier transmission, in accordance with certain aspects of the present disclosure.

Multiple transmitters (e.g., BSs, DUs, gNBs) can be used to ensure contiguous DL from a UE's perspective. FIG. 13 illustrates multiple-transmitter multiple-carrier transmission. The allocation in FIG. 13 is for simplicity (i.e., IP is ~50% per DU per carrier), each DU can make better use of the carrier using different allocations. Although FIG. 13 shows two gNBs, each with 2 CC, in other examples, there may be more gNBs, with various numbers of CCs. Each gNB (or DU) switches (alternates) its CCs between IP and CoT. Thus, there may be multiple DUs, each with multiple CC. There can always be a transmission for each gNB on one of the multiple CCs. In the example shown in FIG. 13, the gNB-A (or DU-A) transmits in a first CoT using CC1 and then switches carrier frequency to transmit in a second CoT using CC2. In the example in FIG. 13, the DU-A transmits in a first CoT using CC1 and then switches to DU-B and transmits in a second CoT using CC1. Thus, the UE always sees an occupied carrier and avoids idle periods, although the gNB occupying the carrier may change. DU-A is shown colored in grey. DU-B is shown colored in black. In some examples, the gNB-B transmits in a first CoT using CC2 and then switches and transmits in a second CoT using CC1. The transmitter may then change to gNB—A and transmit in a third CoT using CC1.

Figure 14A:
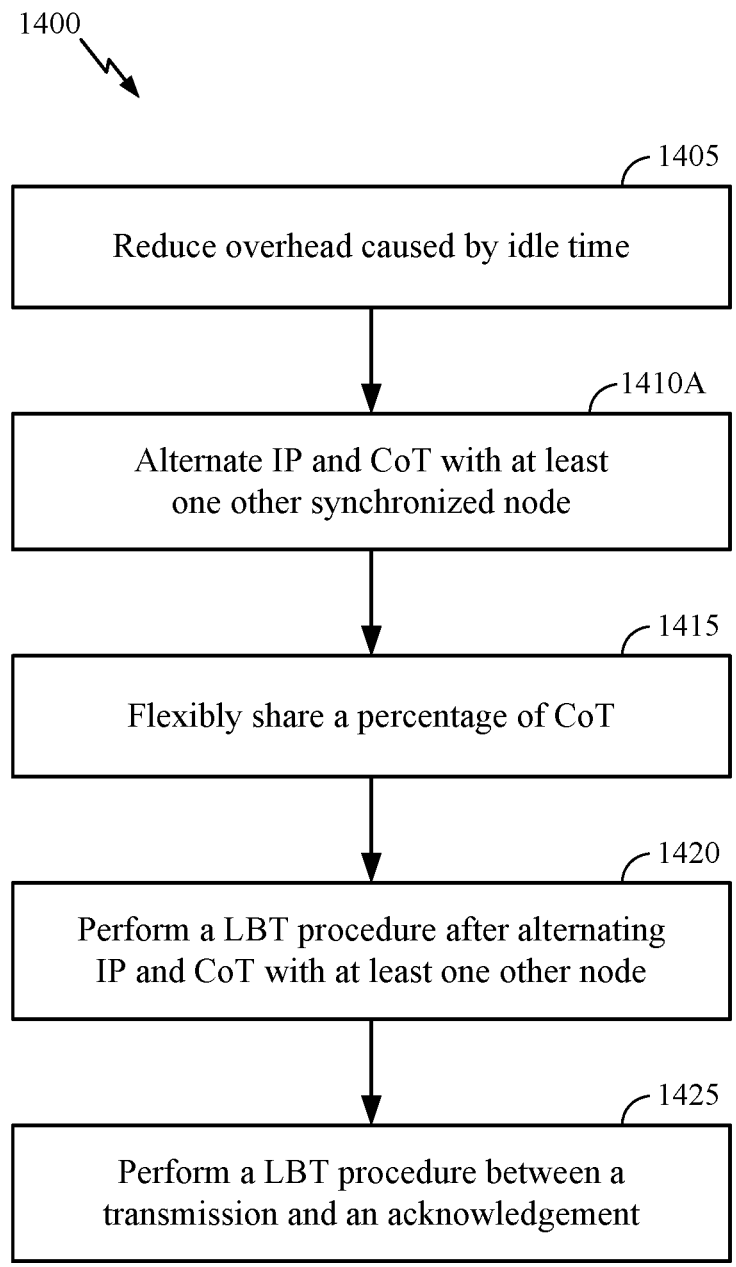
FIG. 14A is a flowchart showing operations to reduce idle time by alternating IPs and CoTs every fixed frame period for different gNBs and/or DUs, in accordance with certain aspects of the present disclosure.
Figure 14B:
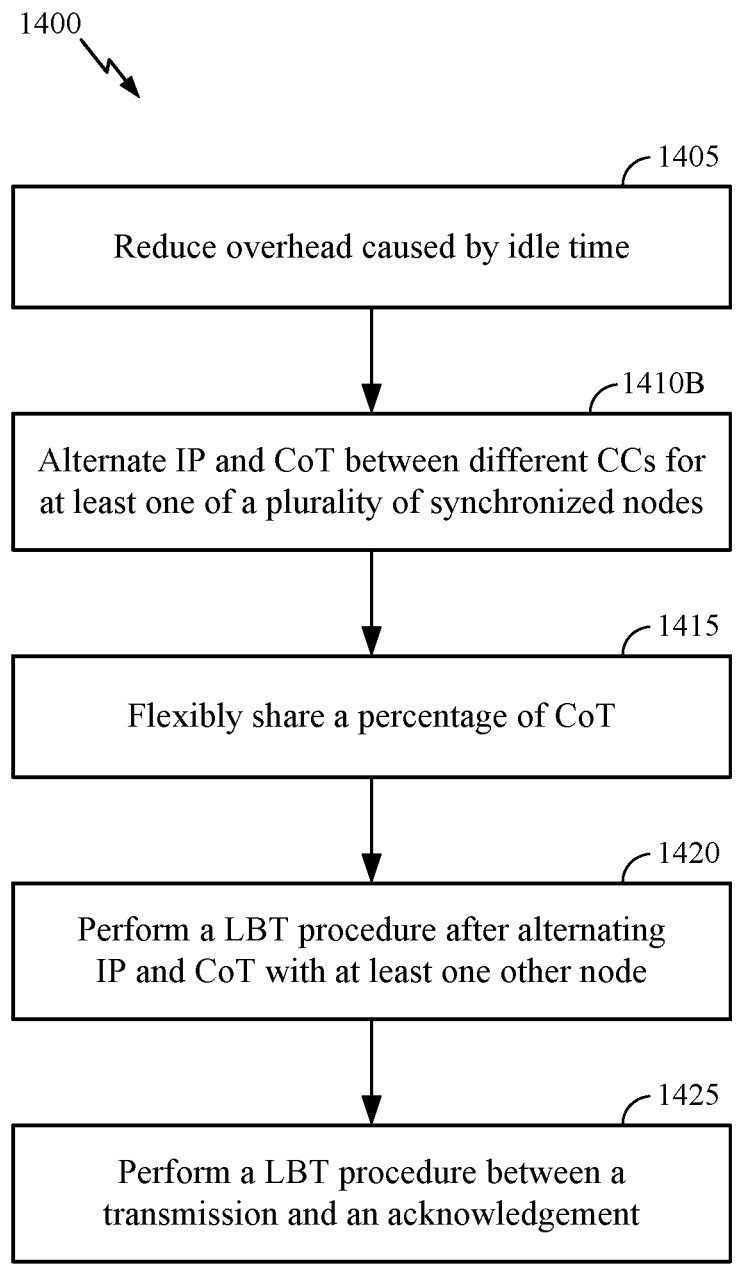
FIG. 14B is a flowchart showing operations to reduce idle time by alternating CoTs and IPs between different CCs of the DU or gNB every fixed frame period, in accordance with certain aspects of the present disclosure.
Figure 14C:
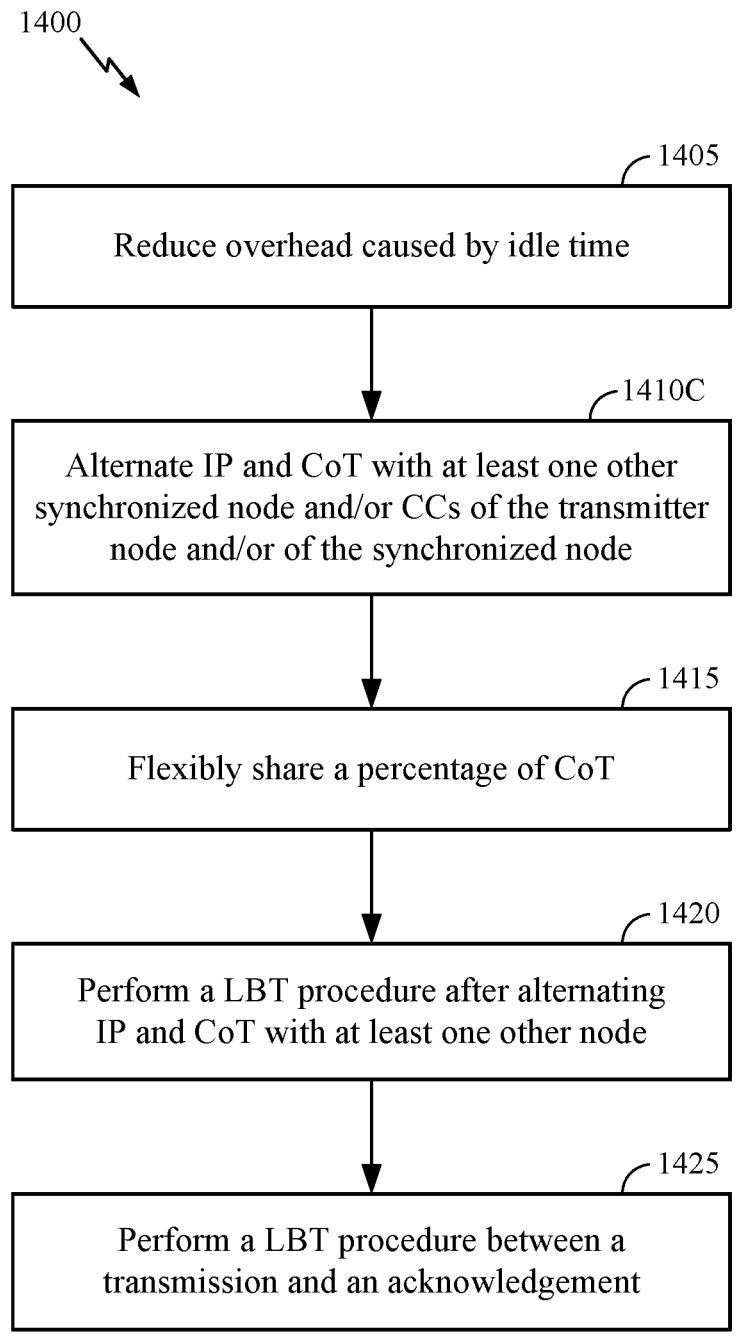
FIG. 14C is a flow chart showing operations to reduce idle time for multiple-transmitter multiple-carrier transmission by alternating between IPs and CoTs every fixed frame period for different gNBs, DUs, and different CCs, in accordance with certain aspects of the present disclosure.

FIGS. 14A-14C illustrate example operations for ensuring full DL scheduling with FBE. The operations may be performed, for example, by one or more transmitting nodes, such as BSs, gNBs, DUs, etc. (e.g., such as the BSs 110 in the wireless communication network 100 in FIG. 1). The operations may be implemented as software components that are executed and run on one or more processors (e.g., controller/processor 440 of FIG. 4). Further, the transmission and reception of signals by the BS may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals.

FIG. 14A is a flowchart illustrating example operations 1400 showing the steps taken by a transmitter node, such as a BS, gNB, or DU to reduce idle time at 1405. At 1410A, the transmitter node alternates IP and CoT with at least one synchronized node (e.g., a DU). At 1415, the transmitter node can flexibly share a percentage of the CoT (e.g., with the synchronized DU). At 1420, the transmitter node performs a LBT procedure after alternating the IP and CoT. At 1425, the transmitter node performs a LBT procedure between a transmission and acknowledgment.

As shown in FIG. 14B, at 1410B, the transmitter node alternates CoTs and IPs between different CCs of the transmitter node.

As shown in FIG. 14C, for multiple-transmitter multiple-carrier transmission with multiple transmitter nodes and one or more transmitter nodes having multiple CCs, at 1410C, the synchronized transmitter node alternates between IP and CoTs with different nodes, different CCs of the transmitter node, and/or different CCs of the transmitter node and one or more of the other synchronized transmitter nodes.

Thus, as described above, a method for wireless communication by a first BS (e.g., transmitter node, gNB, DU, FBE) to ensure full downlink scheduling may include scheduling downlink transmission for at least one device (e.g., UE, FBE). For example, the first BS may schedule the at least one device by alternating IPs and CoTs. In some examples, the first BS alternates IP and CoT between the first BS and at least one other BS, synchronized with the first BS (e.g., in a CoMP). In some examples, the first BS alternates IPs and CoTs between different CCs used by the first BS. In some examples, the first BS alternates IPs and CoTs between both other synchronized BSs and CCs of the first BS. In some examples, the first BS further alternates between CCs used by the other BS(s). In some examples, the method includes transmitting to the at least one device based on the downlink scheduling. In some examples, a percentage of the CoTs scheduled by the first BS and the at least one other BS is flexible. In some examples, the first BS performs a LBT procedure at the end of the scheduled idle periods; after alternating between each of the BSs or CCs; and/or between a transmission and an acknowledgement. In some examples, the different BSs and/or the different CCs are staggered in frequency. In some examples, the IP and CoT are alternated at least one every fixed frame period. In some examples, the BS schedules IPs for the first BS during at least a portion of a CoT for the at least one other BS and schedules CoTs for the first BS during an IP for the at least one other BS.

A UE (e.g., such as a UE 120 in the wireless communication network 100) may perform complimentary operations to the operations 1400 performed by the BS. The UE operations may be implemented as software components that are executed and run on one or more processors (e.g., controller/processor 480 of FIG. 4). Further, the transmission and reception of signals by the UE operations may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

In some examples, the BS may configure the UE with the idle periods for the BS and/or synchronized BSs. In some examples, the UE may ignore CSI-RS during IPs for the respective BS. For example, when providing CSI feedback, the UE may not consider the CSI-RSs received from BSs during an IP for the BSs.

Figure 15:
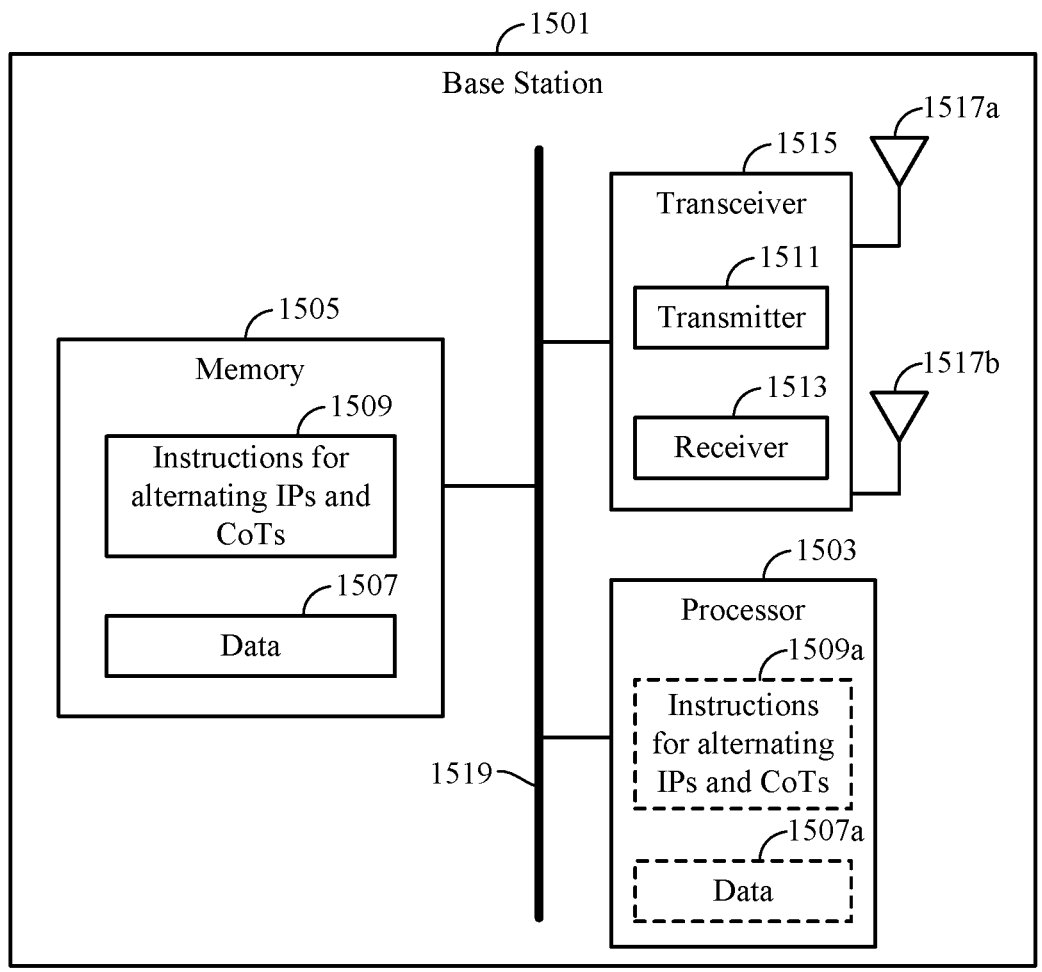
FIG. 15 illustrates certain components that may be included within a BS to perform operations for the techniques disclosed herein, in accordance with certain aspects of the present disclosure.

FIG. 15 illustrates certain components that may be included within a BS 1501. The BS 1501 may be a gNB, DU, etc. The BS 1501 includes a processor 1503. The processor 1503 may be a general purpose single- or multi-chip microprocessor (e.g., an ARM), a special purpose microprocessor (e.g., a digital signal processor (DSP)), a microcontroller, a programmable gate array, etc. The processor 1503 may be referred to as a central processing unit (CPU). Although just a single processor 1503 is shown in the BS 1501 of FIG. 15, in an alternative configuration, a combination of processors (e.g., an ARM and DSP) could be used.

The BS 1501 also includes memory 1505. The memory 1505 may be any electronic component capable of storing electronic information. The memory 1505 may be embodied as random-access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1507 and instructions 1509 may be stored in the memory 1505. The instructions 1509 may be executable by the processor 1503 to implement the methods disclosed herein. For example, the instructions 1509 include instructions for alternating IPs and CoTs, in accordance with aspects of the present disclosure. Executing the instructions 1509 may involve the use of the data 1507 that is stored in the memory 1505. When the processor 1503 executes the instructions 1409, various portions of the instructions 1509a may be loaded onto the processor 1503, and various pieces of data 1507a may be loaded onto the processor 1503.

The BS 1501 may also include a transmitter 1511 and a receiver 1513 to allow transmission and reception of signals to and from the wireless device 1501. For example, the transmitter 1511 may be configured to send DL scheduling and send downlink transmissions to at least one UE based on the DL scheduling, in accordance with aspects of the present disclosure. The transmitter 1511 and receiver 1513 may be collectively referred to as a transceiver 1515. Multiple antennas 1517a-b may be electrically coupled to the transceiver 1515. The BS 1501 may also include (not shown) multiple transmitters, multiple receivers and/or multiple transceivers.

The various components of the BS 1501 may be coupled together by one or more buses, which may include a power bus, a control signal bus, a status signal bus, a data bus, etc. For the sake of clarity, the various buses are illustrated in FIG. 15 as a bus system 1519. The functions described herein in the flowchart of FIG. 14, may be implemented in hardware, software executed by a processor like the processor 1503 described in FIG. 15.

Figure 16:
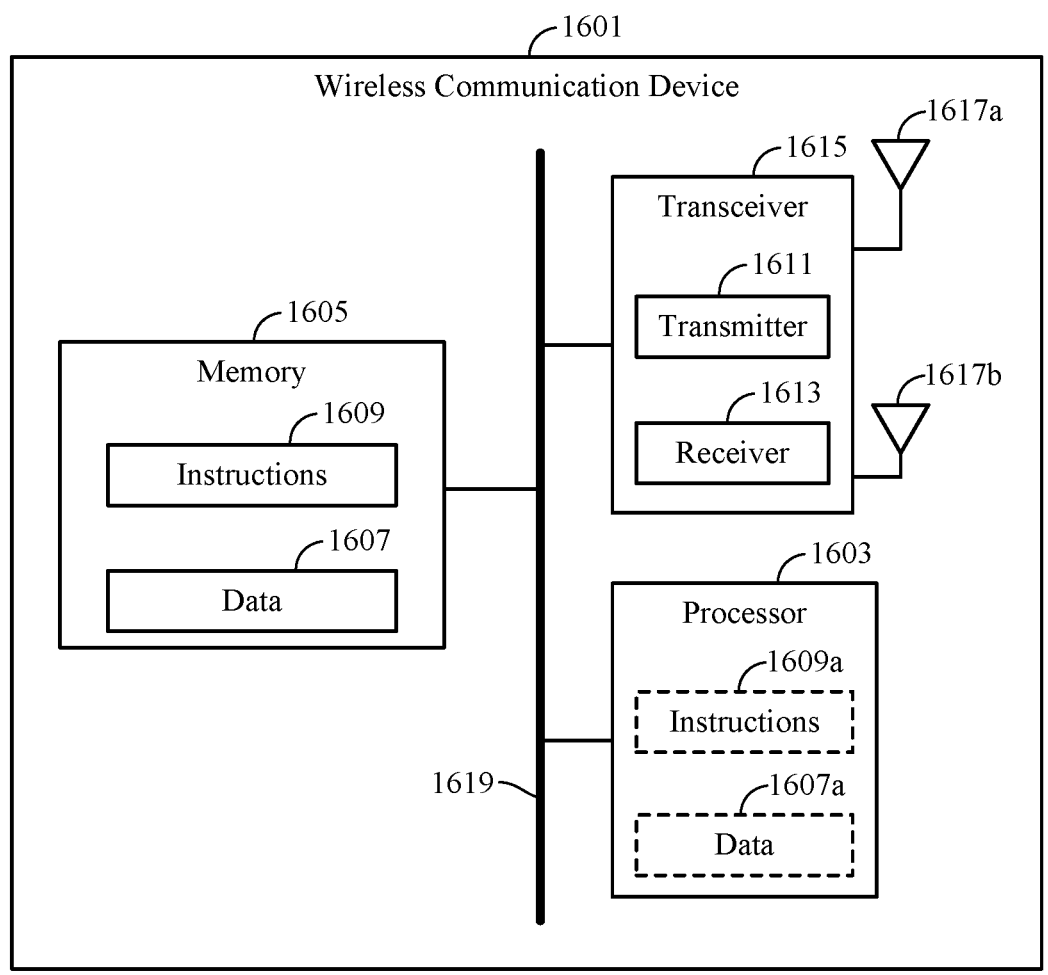
FIG. 16 illustrates certain components that may be included within a wireless communication device to perform operations for the techniques disclosed herein, in accordance with certain aspects of the present disclosure.

FIG. 16 illustrates certain components that may be included within a wireless communication device 1601. The wireless communication device 1601 may be an access terminal, a mobile station, a UE, etc. The wireless communication device 1601 includes a processor 1603. The processor 1603 may be a general-purpose single- or multi-chip microprocessor (e.g., an ARM), a special purpose microprocessor (e.g., a digital signal processor (DSP)), a microcontroller, a programmable gate array, etc. The processor 1603 may be referred to as a central processing unit (CPU). Although just a single processor 1603 is shown in the wireless communication device 1601 of FIG. 16, in an alternative configuration, a combination of processors (e.g., an ARM and DSP) could be used.

The wireless communication device 1601 also includes memory 1605. The memory 1605 may be any electronic component capable of storing electronic information. The memory 1605 may be embodied as random-access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1607 and instructions 1609 may be stored in the memory 1605. The instructions 1609 may be executable by the processor 1603 to implement the methods disclosed herein. Executing the instructions 1609 may involve the use of the data 1607 that is stored in the memory 1605. When the processor 1603 executes the instructions 1609, various portions of the instructions 1609a may be loaded onto the processor 1603, and various pieces of data 1607a may be loaded onto the processor 1603.

The wireless communication device 1601 may also include a transmitter 1511 and a receiver 1613 to allow transmission and reception of signals to and from the wireless communication device 1601. The transmitter 1611 and receiver 1613 may be collectively referred to as a transceiver 1615. Multiple antennas 1617a-b may be electrically coupled to the transceiver 1615. The wireless communication device 1601 may also include (not shown) multiple transmitters, multiple receivers and/or multiple transceivers.

The various components of the wireless communication device 1601 may be coupled together by one or more buses, which may include a power bus, a control signal bus, a status signal bus, a data bus, etc. For the sake of clarity, the various buses are illustrated in FIG. 16 as a bus system 1619. It should be noted that these methods describe possible implementation, and that the operations and the steps may be rearranged or otherwise modified such that other implementations are possible.

In some examples, aspects from two or more of the methods may be combined. For example, aspects of each of the methods may include steps or aspects of the other methods, or other steps or techniques described herein. Thus, aspects of the disclosure may provide for receiving on transmit and transmitting on receive. Although FIG. 14 was discussed with reference to a BS, it should be understood that a UE, such as UE 1600, may perform the corresponding transmitting that is received and monitored by the BS as well as the receiving of the information indicated by the BS discussed in FIG. 14 and may be implemented in hardware, software executed by a processor like the processor 1603 described in FIG. 16.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications network 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communication by a first base station (BS) to ensure full downlink scheduling, comprising:
scheduling downlink transmission to at least one device, the scheduling comprising for each fixed frame period of a plurality of consecutive fixed frame periods:
aligning, in a time domain, an ending boundary of an idle period of the first BS, a first component carrier (CC), or both with an ending boundary of a channel occupancy time (CoT) of at least one other BS, CC, or both, and a starting boundary of the idle period of the first BS, the first CC, or both with a starting boundary of a listen-before-talk (LBT) period adjacent to the CoT of the at least one other BS, CC or both; and
aligning, in the time domain, an ending boundary of a CoT of the first BS, the first CC, or both with an ending boundary of an idle period of the at least one other BS, CC, or both, wherein the first BS and the at least one other BS comprise frame-based equipments (FBEs); and
communicating with the at least one device based on the scheduling.

2. The method of claim 1, wherein a percentage of the CoTs scheduled by the first BS and the at least one other BS is flexible.

3. The method of claim 1, further comprising aligning a starting boundary of a LBT period of the first BS, the first CC, or both before the CoT of the first BS, the first CC, or both with the starting boundary of the idle period of the at least one other BS, CC, or both.

4. The method of claim 1, further comprising performing a LBT procedure between a transmission and an acknowledgement during the CoT of the first BS, the first CC, or both.

5. The method of claim 1, wherein the first BS and the at least one other BS belong to a coordinated multipoint (CoMP) cluster of BSs.

6. The method of claim 1, wherein the scheduling further comprises alternating the idle periods and the CoTs between different CCs of the first BS and the at least one other BS.

7. The method of to claim 6, wherein the first CC and the at least one other CC are staggered in a frequency domain.

8. An apparatus for wireless communication by a first base station (BS) to ensure full downlink scheduling, comprising:
at least one processor configured to:
schedule downlink transmission to at least one device, the scheduling comprising for each fixed frame period of a plurality of consecutive fixed frame periods:
aligning, in a time domain, an ending boundary of an idle period of the first BS, a first component carrier (CC), or both with an ending boundary of a channel occupancy time (CoT) of at least one other BS, CC, or both, and a starting boundary of the idle period of the first BS, the first CC, or both with a starting boundary of a listen-before-talk (LBT) period adjacent to the CoT of the at least one other BS, CC or both; and
aligning, in the time domain, an ending boundary of a CoT of the first BS, the first CC, or both with an ending boundary of an idle period of the at least one other BS, CC, or both, wherein the first BS and the at least one other BS comprise frame-based equipments (FBEs); and
communicate with the at least one device based on the scheduling; and
a memory coupled with the at least one processor.

9. The apparatus of claim 8, wherein a percentage of the CoTs scheduled by the first BS and the at least one other BS is flexible.

10. The apparatus of claim 8, wherein the at least one processor is further configured to align a starting boundary of a LBT period of the first BS, the first CC, or both before the CoT of the first BS, the first CC, or both with the starting boundary of the idle period of the at least one other BS, CC, or both.

11. The apparatus of claim 8, wherein the at least one processor is further configured to perform a LBT procedure between a transmission and an acknowledgement during the CoT of the first BS, the first CC, or both.

12. The apparatus of claim 8, wherein the first BS and the at least one other BS belong to a coordinated multipoint (CoMP) cluster of BSs.

13. The apparatus of claim 8, wherein the at least one processor is further configured to alternate the idle periods and the CoTs between different CCs of the first BS and the at least one other BS.

14. The apparatus of to claim 13, wherein the first CC and the at least one other CC are staggered in a frequency domain.

15. An apparatus for wireless communication by a first base station (BS) to ensure full downlink scheduling, comprising:
means for scheduling downlink transmission to at least one device, the scheduling comprising for each fixed frame period of a plurality of consecutive fixed frame periods:
aligning, in a time domain, an ending boundary of an idle period of the first BS, a first component carrier (CC), or both with an ending boundary of a channel occupancy time (CoT) of at least one other BS, CC, or both, and a starting boundary of the idle period of the first BS, the first CC, or both with a starting boundary of a listen-before-talk (LBT) period adjacent to the CoT of the at least one other BS, CC or both; and
aligning, in the time domain, an ending boundary of a CoT of the first BS, the first CC, or both with an ending boundary of an idle period of the at least one other BS, CC, or both, wherein the first BS and the at least one other BS comprise frame-based equipments (FBEs); and
means for communicating with the at least one device based on the scheduling.

16. The apparatus of claim 15, further comprising:
means for aligning a starting boundary of a LBT period of the first BS, the first CC, or both before the CoT of the first BS, the first CC, or both with a starting boundary of the idle period of the at least one other BS, CC, or both;

means for performing an LBT procedure between a transmission and an acknowledgement during the CoT of the first BS, first CC, or both; or a combination thereof.

17. A non-transitory computer readable medium having computer executable code stored thereon for wireless communication by a first base station (BS) to ensure full downlink scheduling, comprising:

code for scheduling downlink transmission to at least one device, the scheduling comprising for each fixed frame period of a plurality of consecutive fixed frame periods:

aligning, in a time domain, an ending boundary of an idle period of the first BS, a first component carrier (CC), or both with an ending boundary of a channel occupancy time (CoT) of at least one other BS, CC, or both, and a starting boundary of the idle period of the first BS, the first CC, or both with a starting boundary of a listen-before-talk (LBT) period adjacent to the CoT of the at least one other BS, CC or both; and aligning, in the time domain, an ending boundary of a CoT of the first BS, the first CC, or both with an ending boundary of an idle period of the at least one other BS, CC, or both, wherein the first BS and the at least one other BS comprise frame-based equipments (FBEs); and code for communicating with the at least one device based on the scheduling.

* * * * *